Aug. 20, 1940.  A. W. KRETZSCHMAR  2,211,784
SPEED GOVERNOR
Filed Jan. 7, 1937  2 Sheets-Sheet 1

INVENTOR
August W. Kretzschmar,
BY
ATTORNEYS

Patented Aug. 20, 1940

2,211,784

UNITED STATES PATENT OFFICE 2,211,784

SPEED GOVERNOR

August W. Kretzschmar, Detroit, Mich.

Application January 7, 1937, Serial No. 119,388

3 Claims. (Cl. 137—152)

The present invention relates to governing devices for limiting the maximum speed of automotive vehicles to any predetermined rate and is applicable to any type of vehicle having an internal combustion engine equipped with a carburetor and manifold.

The primary object of the invention is to provide means for limiting the maximum speed of a vehicle to a predetermined rate which functions at substantially a constant rate regardless of varying conditions under which the vehicle is operated such as, for instance, when the vehicle is running on the level, up or down grade, or under varying load conditions.

Another object of the invention is to provide a governing device for an internal combustion engine for limiting the maximum speed thereof to a predetermined rate which will not interfere with full engine power during starting and while the engine is being accelerated until that maximum rate is reached.

Prior devices for governing the speed of vehicles include a centrifugal governor operated by a moving part of the vehicle engines, and operate valves for controlling the fuel supply to the engines. The valves, actuated by the governors, gradually close with increasing engine speed and result in choking of the fuel supply. The result is loss of possible acceleration and lack of response for road maneuvers, such as may be expected from an underpowered vehicle. It is another object of this invention to avoid such undesirable conditions by providing a governing device wherein the valve for controlling the fuel supply functions rapidly while moving from either of its two maximum positions, wherein it cuts off the fuel supply to the engine or permits the fuel to flow thereto unrestrictedly.

A further object of the present invention is to provide a governing device including a fuel control valve which is subject to a combination of forces tending to cause movement thereof. The velocity of the fuel flow is employed as one force tending to move the valve and a manually variable spring resistance acts against the first force, one force tending to move the valve to one extreme position and the other tending to move the valve to its other extreme position.

Another object of the present invention is to provide a governing device with a pendulum connected to the fuel control valve which exerts a force independent of the two forces above referred to for operating the valve to compensate in possible fuel flow for up and down grades. The axis of pendulum movement and its connection with the control valve are so related with the direction of travel of the vehicle that inclination and declination of the vehicle results in pendulum movement and regulating movement of the valve.

A further object of the invention is to provide a pendulum that moves in response to acceleration of the vehicle in a forward direction to move the valve to its maximum open position.

Another object is to provide a pendulum which functions in the nature of an inertia device for holding the fuel control valve closed during deceleration of the vehicle until such time as the force exerted by the spring resistance overbalances the force exerted by the fuel flow whereby the spring resistance functions to move the valve rapidly from its fully closed to its fully open position.

A further object of the present invention is to construct the pendulum in the form of a weighty wheel for residence in the path of the fuel flow. The wheel is capable of free rotation and the spokes of the wheels are constructed as vanes for impingement of the fuel flow thereagainst. The wheel, in being rotated by impingement of the fuel flow against the vanes thereof possesses the quality of resisting angular displacement of its axis. It tends, therefore, to stabilize the governing in that it prevents movements of the pendulum in response to road shocks etc. during travel of the vehicle and further, it exerts a force tending to hold the pendulum in any position of adjustment so that a slight fluctuation in the fuel flow will not effect movement of the control valve. There is also improved fuel economy resulting from the twisting action imparted to the fuel by the vanes.

With the above and other ends in view the invention is more fully disclosed with reference to the accompanying drawings, in which—

Like characters of reference are employed throughout to designate corresponding parts.

Figure 2:
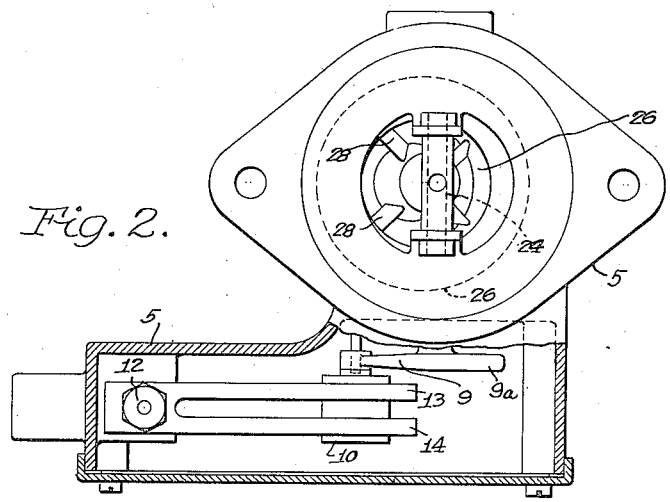
Fig. 2 is a view showing the device in plan, the housing and cover being shown in section.
Figure 1:
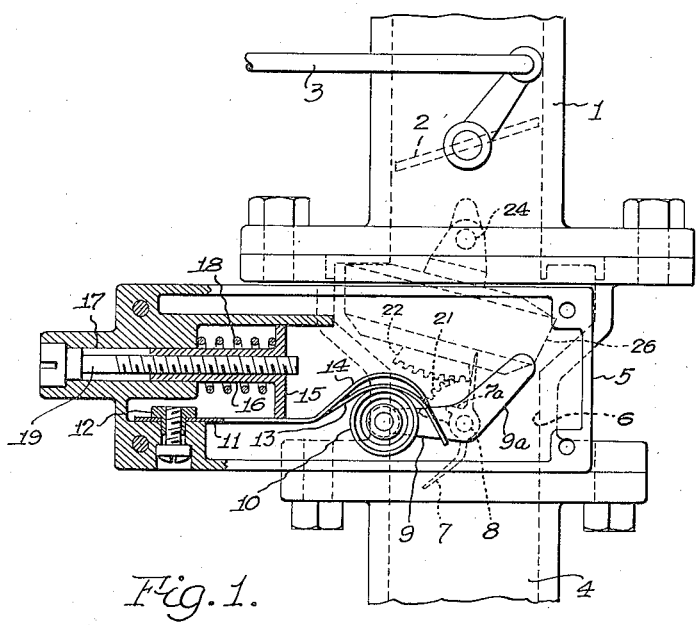
Figure 1 is a side view, partly in section and partly in elevation, the cover to the governing device being removed.

The numeral 1 designates a manifold section adapted to have a carburetor (not shown) mounted upon its upper end. Within the section 1 is the usual throttle valve 2 having linkage 3 through which manual pressure may be applied thereto for the purpose of opening and closing the same. A second manifold section 4 leads to the engine (not shown) and is connected to the section 1 by a casing 5 having a conduit 6 coaxial with the sections 1 and 4. The present governing device is mounted in the casing 5.

In the conduit 6 is provided a butterfly valve 7, supported by a shaft 8, the axis of which is parallel with the axis of the valve 2 and normal to the direction of forward travel. The valve 7 is formed with one wing thereof having a substantial portion inclined with respect to the plane of the other wing so that when the wings are horizontal the inclined portion is inclined with respect to the horizontal by a substantial number of degrees, say approximately thirty degrees. The valve 7 also has a small ledge 7a which extends perpendicular to the wings. Secured on the shaft 8 externally of the conduit 6 is an arm 9 having a roller 10 on the outer end thereof for engagement by a suitable resiliency. The arm 9 has a counterbalance 9a secured thereto for counterbalancing the weight of the roller 10.

The resiliency which engages the roller 10 comprises a leaf spring 11 anchored to the casing at 12 and having two long, thin, light spring fingers 13 and 14 extending in the direction of the roller 10. The outer ends of the spring fingers 13 and 14 are formed to hook over the roller 10 and with the arm 9 in the position shown, wherein the valve 7 is in its maximum open position, the spring finger 13 is in engagement with the roller 10 and the spring finger 14 is spaced above the roller 10. The spring 11 and arm 9 are relatively positioned so that swinging movement of the arm 9 in a clockwise direction causes the roller 10 to flex both spring fingers. Furthermore, this movement of the arm causes the roller 10 to move in a direction away from the point of attachment of the spring 11 to the casing 5.

To regulate the opposition of the resiliency to movement of the arm 11 in a clockwise direction an adjustable abutment 15 is provided. The abutment 15 engages the top surfaces of the two spring fingers 13 and 14 and has a tubular portion 16 received in a bore 17 in the casing 6. The abutment 15 is normally pressed outwardly by a compressed coil spring 18 which is sleeved on the tubular portion 16 and may be moved to and held in various positions of adjustment by a set screw 19.

The shaft 8 is provided with a sector gear 20 meshing with a sector gear 22 on the end of a shaft 23. The shaft 23 is suspended at its other end by a freely rockable shaft 24 mounted in bearings 25. The shaft 23 has a weighty wheel 26 supported thereon by anti-friction bearings 27 and freely rotatable with respect thereto. The wheel 26 has spokes 28 constructed as inclined vanes so that the gases flowing through the sections 1 and 2 and the conduit 6 rotate the wheel and the liquid particles therein are broken up.

The wheel 26, with its shaft 24 and bearings 25 constitutes a pendulum and also an inertia device so that as the vehicle, and the conduits 1 and 2, assume an inclination because of up or down grade travel the pendulum urges movement of the valve 7 toward an open position in the first case and toward a closed position in the second case. Upon acceleration and deceleration the pendulum also acts to urge movement of the valve toward open and closed positions respectively. The design is so proportioned that the number of degrees through which the pendulum swings is multiplied in the movement of the valve 7.

Figure 5:
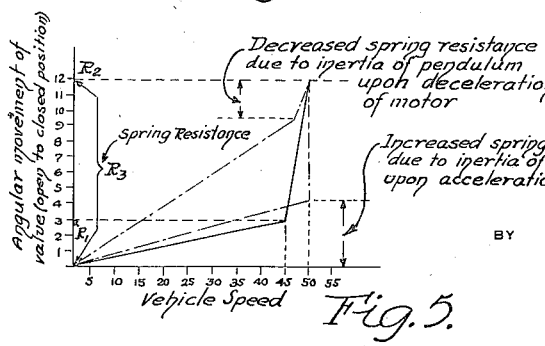
Fig. 5 is a diagram illustrating the co-operative functions of the governor parts.
Figure 3:
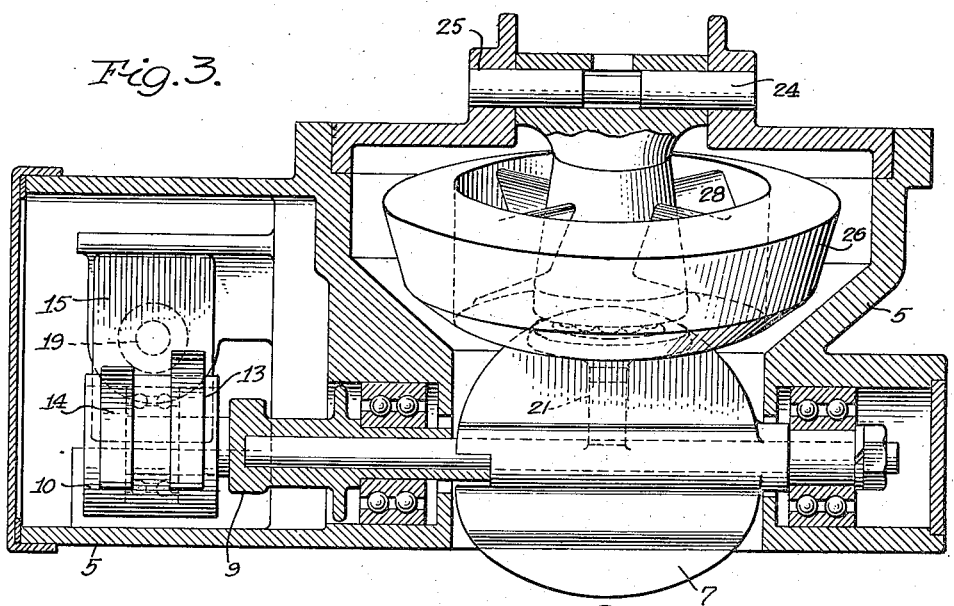
Fig. 3 is a vertical section taken at right angles to Fig. 1 and illustrating the pendulum.

At the beginning of the operation the parts are in the position shown in Fig. 6. As illustrated, the spring finger 13 is in contact with the roller 10 and yieldably opposes movement thereof. The resistance which the spring finger 13 offers to movement of the arm 9 is designated on Fig. 5 as R1. The spring finger 14 is out of contact with the roller 10 and initially offers no opposition to movement of the arm 9. After a predetermined movement of the arm 9, however, the roller 10 contacts the spring finger 14 and the latter opposes movement of the arm 9. The resistance which the spring finger 14 offers to movement of the arm 9 is designated in Fig. 5 as R2. The combined resistances of both spring fingers is designated in Fig. 5 as R3. The fuel in flowing through the sections 1 and 2 and the conduit 6 at a high velocity impinges upon the wheel 26 and valve 7 in such manner as to tend to close the valve. Resistance R1, exerted by spring finger 13, opposes the force exerted by impingement of the fuel flow and holds the valve 7 in its open position. The fuel flow, in impinging upon the vanes 28 causes the wheel 26 to rotate and rotation of the wheel causes it to resist angular displacement of its axis. When, however, the forces acting upon the wheel and valve 7 are sufficient to overcome the resistance R1 of the spring finger 13 the valve 7 moves toward a closed position. It has been found from actual experience that once the valve 7 starts to move toward its closed position it moves very rapidly. As it moves toward its closed position the roller 10 contacts the spring arm 14 so that the latter opposes movement of the arm 9. The combined resistances of R1 and R2, or as indicated as R3, determines the position at which the arm 9 and valve 7 come to rest. In other words R3 is a force which balances against the forces tending to fully close the valve and determines the area of the opening when the valve is in its governing position. The speed at which the governor operates is dependent upon the resistance R3, whereas the speed at which the governor starts its function is dependent upon the resistance R1.

Assuming that the engine which the governor controls is the power plant of an automotive vehicle it is obvious that the forces exerted by the pendulum act upon the device to vary the area of the opening. For example, when the vehicle is accelerating the pendulum tends to swing rearwardly and in so doing tends to add resistance to the resistance R1 exerted by the spring 13 so as to delay initial movement of the valve 7. Resistance R1 would then permit initial movement of the arm 10 at a rate of speed quite close to the maximum rate which is indicated on Fig. 5 as fifty miles per hour. If acceleration were not so great, or in other words, if the maximum speed were more slowly approached, the opposition added to resistance R1 by the tendency of the pendulum to swing would not be so great, and movement of the arm 9 would start at a lower rate of speed.

When the maximum rate of speed has been attained and the impingement of the fuel flow closes the valve 7 the fuel flow to the engine is throttled down and the engine immediately starts to decelerate. The pendulum then tends to swing forwardly and exerts a force tending to hold the valve closed and opposes the resistance R3 which urges opening movement of the valve. Therefore, when the resistance R3 overcomes the force set up by the pendulum the valve 7 is rapidly moved to a fully open position. This function insures full engine power for all speeds beneath the maximum speed by avoiding possibility of the several forces acting upon the valve becoming balanced at a point where the valve is, for example, half open or half closed.

The valve 7 does not entirely close the conduit 6 at any time, it being so constructed that a small area of opening is present when it is in its maximum closed position. The area of the opening is dependent upon the balancing of the forces set up by impingement of the air flow with the forces or resistance R3. The resistance R3 may be increased by moving the abutment 15 toward the free ends of the spring fingers or decreased by moving it toward the point of attachment to the casing 6.

The device as actually built according to the above description is characterized by the rapidity with which the valve 7 is moved from its maximum positions. With the wheel 26 held stationary this characteristic is not so pronounced which supports the theory that in rotating at a high rate of speed, due to impingement of the fuel against the vanes 28, a gyroscopic action is present which opposes displacement of the axis of the wheel and, therefore, swinging movement of the pendulum. It is estimated that with the valve 7 in its maximum closed position the wheel will revolve at approximately 1000 R. P. M. This resistance to displacement of the axis acts as a check on the swinging movement of the pendulum from any given position. This condition, combined with a spring resistance which increases rapidly after a predetermined valve movement results in a rapid movement of the valve to a closed position. Due to the fact that impingement of the fuel flow, rather than the pressure thereof, is utilized to close the valve, the force which closes the valve terminates when the valve is closed and the resistance R3 need only be sufficient to overcome the gyroscopic action of the wheel 26 and the inertia of the pendulum in order to open the valve. These last two forces result in a slight delay in the opening of the valve, but once their inertia is overcome the valve moves very rapidly. The resulting function approximates a snap action in that the movement from either the open position to maximum closed position is characterized by its rapidity.

Figure 4:
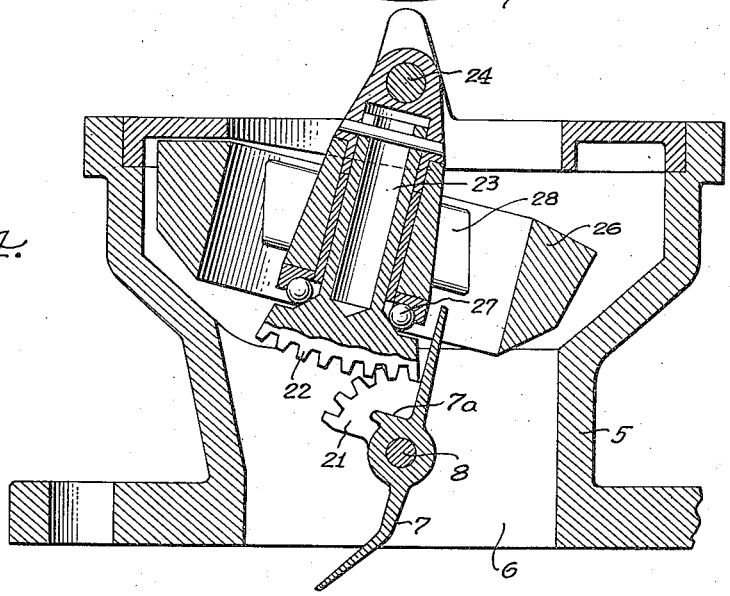
Fig. 4 is a vertical section taken at right angles to Fig. 3.

In Fig. 4 of the drawings, the ledge 7a on the valve 7 is more clearly shown. This ledge extends perpendicular to the upper wing of the valve adjacent the base thereof, in the case of a down draft carburetor such as shown. This ledge seems to function as a collector to build up pressure by impingement of the fuel flow which tends to move the valve to its closed position. I am unable to explain the action which takes place because of the presence of this ledge but actual experience has shown that the invention functions more efficiently and reliably when the ledge is present than when it is not present.

Although the invention is illustrated and described as designed for a down draft carburetor it will be understood that it is adaptable to any type of engine and carburetor, and that various changes may be made within the scope of the appended claims without departing from the spirit of the invention. Such changes are contemplated.

What I claim is:

1. In an engine speed governing device having a valve operating arm movable to extreme opposite positions in response to fuel flow and urged to remain in the extreme positions by a gyroscopic pendulum device, a single leaf spring bifurcated to provide a pair of laterally positioned spring fingers for yieldingly opposing movement of the arm in one direction and extending transverse to the axis of the arm, one of said fingers constantly opposing movement of the arm in said one direction and the other of said fingers being arranged to aid the first-named finger on predetermined movement of said arm in said one direction, said fingers having hooked ends to receive said arm.

2. In an engine speed governing device having a fuel flow control valve operable in response to fuel flow and actuated by a gyroscopic pendulum device, a leaf spring member bifurcated at one end providing a pair of spring fingers, one of said springs constantly yieldably opposing movement of the valve in one direction and the other of said springs aiding said one spring on predetermined movement of the valve, and a movably adjustable fulcrum common to both of said spring fingers to adjust the tension thereof.

3. In a liquid fuel feed system having a fuel supply conduit, a butterfly valve pivotally balanced and disposed in said conduit to control flow therethrough, means operable in response to fuel flow through said conduit to move said valve between closed and open positions, one of the wings of said butterfly valve having an angularly disposed portion directed counter to the direction of fuel flow, and a ledge on the other of the valve wings adjacent the valve pivot and directed counter to the direction of fuel flow, said ledge cooperating with said other valve wing to provide a pocket to build up fuel pressure acting to close said valve.

AUGUST W. KRETZSCHMAR.